Figure 4:
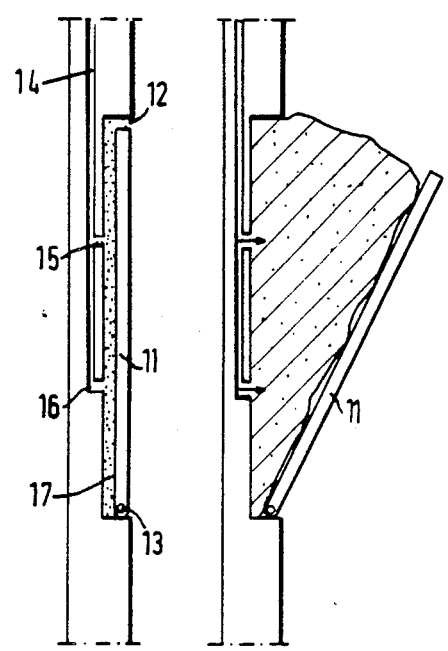

United States Patent [19]

van de Velde et al.

[11] Patent Number: 4,981,393

[45] Date of Patent: Jan. 1, 1991

[54] METHOD AND APPARATUS FOR CELLULARLY ISOLATING, TREATING AND/OR REMOVING STRONGLY POLLUTED MATERIAL PRESENT IN OR ON THE SOIL

[75] Inventors: Johannes L. van de Velde, Rotterdam; Johannes P. van der Meer, Capelle aan den IJssel; Frederik H. M. Mischgofsky, Delft, all of Netherlands

[73] Assignees: Ecotechniek B. V., Rosmalen; Heijmans Milieutechniek B. V., Utrecht, both of Netherlands

[21] Appl. No.: 150,931

[22] Filed: Feb. 1, 1988

[30] Foreign Application Priority Data

Feb. 2, 1987 [NL] Netherlands .......................... 8700246

[51] Int. Cl.$^5$ ................................................ B09B 5/00
[52] U.S. Cl. ..................................... 405/128; 405/232; 252/633
[58] Field of Search ......................... 405/128, 129, 232; 175/226, 253, 254, 244; 252/626, 633

[56] References Cited

U.S. PATENT DOCUMENTS

| 1,350,112 | 12/1963 | FRX . |  |
|---|---|---|---|
| 2,034,072 | 3/1936 | Wright | 175/254 |
| 2,036,451 | 12/1970 | FRX . |  |
| 2,230,808 | 2/1941 | Mohr | 175/254 |
| 3,064,742 | 11/1962 | Bridwell | 175/226 |
| 3,298,450 | 1/1967 | Sato | 175/226 |
| 3,409,094 | 11/1968 | Kretschmer et al. | 175/254 X |
| 3,446,827 | 6/1986 | DEX . |  |
| 3,638,433 | 2/1972 | Sherard . |  |
| 3,675,428 | 7/1972 | Watts . |  |
| 3,835,652 | 9/1974 | Hignite . |  |
| 4,071,099 | 1/1978 | Hensel | 175/226 X |
| 4,632,602 | 12/1986 | Hovnanian | 405/128 |
| 4,687,373 | 8/1987 | Falk et al. | 405/128 |
| 6,506,137 | 11/1965 | NLX . |  |
| 6,603,901 | 9/1966 | NLX . |  |

Primary Examiner—Dennis L. Taylor
Attorney, Agent, or Firm—Weingarten, Schurgin, Gagnebin & Hayes

[57] ABSTRACT

Polluted material contained in, or lying on the ground is isolated, treated in situ and/or removed by (a) placing laterally closed, hollow piles in the soil according to a lattice pattern in adjoining relationship; said piles having closable top and bottom ends;

(b) closing the top and bottom ends of the piles placed in the ground;

(c) optionally passing a treating medium into the polluted material enclosed within a pile; and/or (d) removing the piles with the material enclosed therein from the soil and transporting them to a different location.

A pile is disclosed for use in the method.

4 Claims, 3 Drawing Sheets

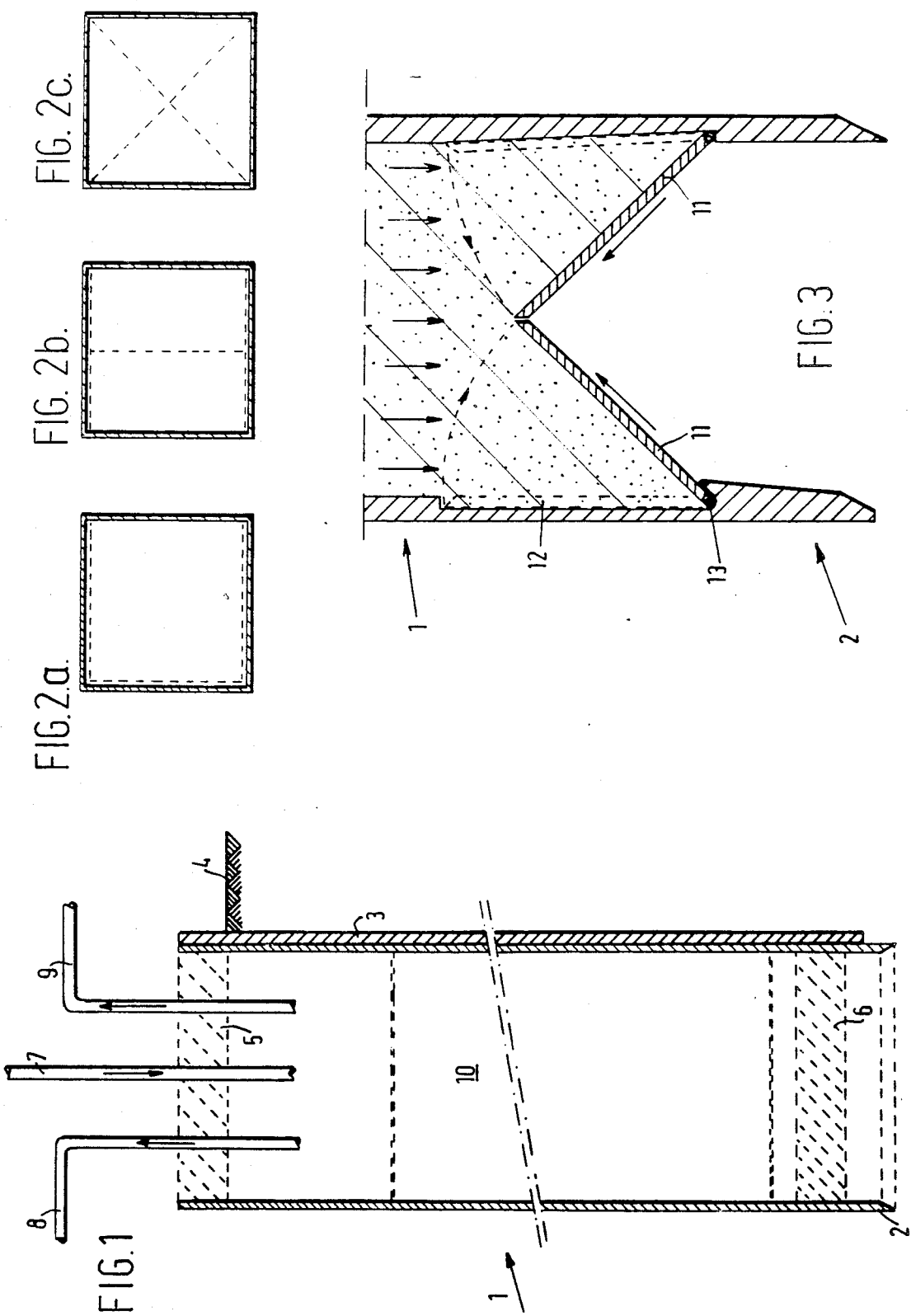

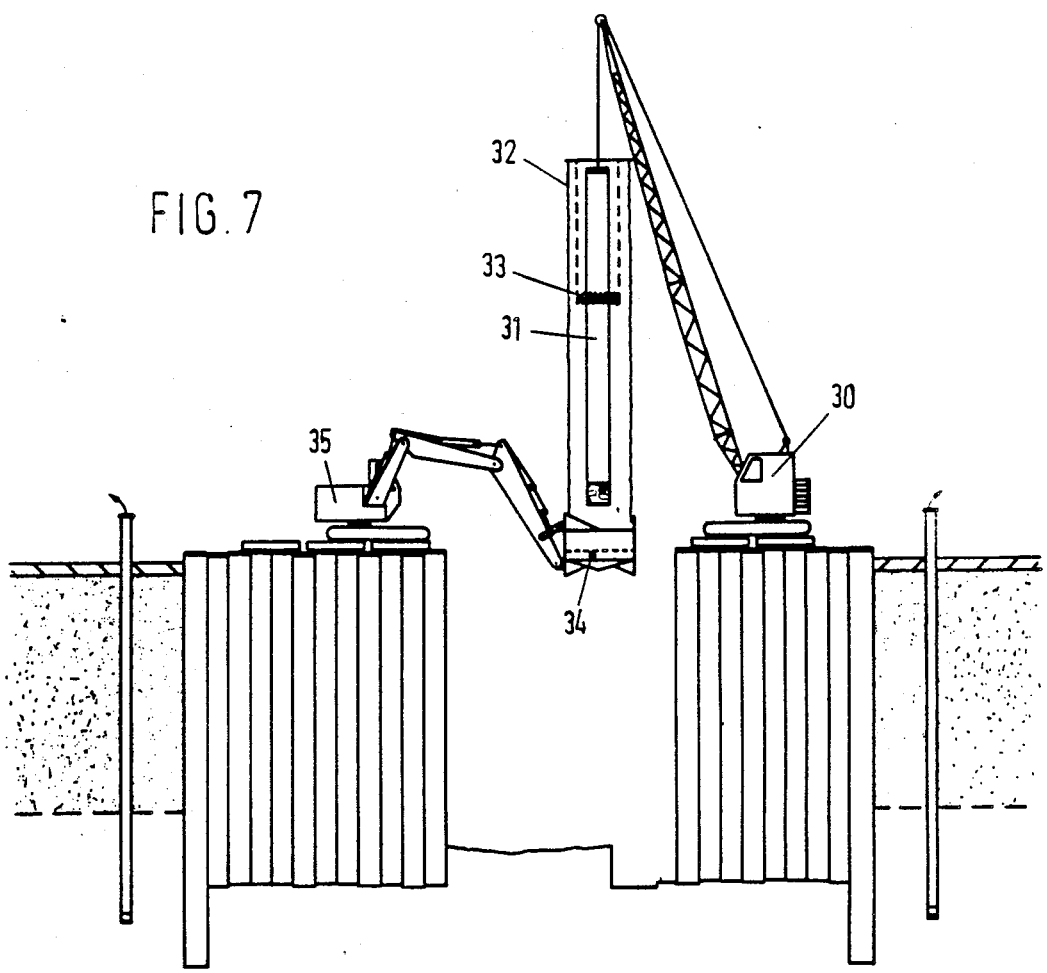

METHOD AND APPARATUS FOR CELLULARLY ISOLATING, TREATING AND/OR REMOVING STRONGLY POLLUTED MATERIAL PRESENT IN OR ON THE SOIL

In many places the ground is strongly polluted by many years of often unsupervised dumping of chemical or other waste materials, or by spillage of chemicals, thus rendering such places unsuitable for other use of the soil, e.g. as arable land. It has been found that the dumping tips often have a polluting effect on the soil surrounding these tips; they are not isolated relative to their surroundings and often have an adverse effect on e.g. the quality of the groundwater in the wide surroundings.

From environmental considerations, it is at least desirable and often necessary to isolate such soil pollutants relatively to the surroundings, to treat them at the location concerned or even to remove them altogether. Since the detrimental effect of many soil pollutants cannot be properly neutralized without adverse effect on the surroundings, the total removal of the polluted soil or of the waste will often be necessary.

The only usable and employed method of removing the polluted material has been, up till now, the entire excavation thereof by means of known per se excavating tools and the transport of the excavated material for destruction or dumping at a better isolated, less dangerous tip. This excavation immediately meets with objections in the case of a polluted soil containing toxic pollutants which due to excavation may be released in gaseous form or as (adhering to) dust particles. Moreover, many cubic meters of soil are moved unnecessarily during conventional excavation, since the conventional slopes are to be maintained.

At tips having a small bearing capacity, the use of excavating tools requires extensive preliminary operations for increasing such capacity.

It is an object of the present invention to provide a directly usable method of isolating, treating and/or removing strongly polluted material present in or on the soil, in cells with elimination of the above drawbacks.

The method of the present invention is characterized to that end by
placing laterally closed, hollow piles in the soil according to a lattice pattern in adjoining relationship; said piles being closable at the bottom and top ends;
closing the bottom and top ends of the piles placed in the soil;
removing the piles together with the material enclosed therein from the soil; and
transporting the piles together with the material contained therein.

The piles to be placed in the soil have a large internal cross-sectional area, preferably ranging between 4 and 9m². Their cross-sectional shape may be rectangular, polygonal or even round. They are driven into the soil in known per se manner e.g. by pile driving, vibrating or pressing operations. The piles can be removed from the soil by pulling them out by means of known per se apparatuses or alternatively by tilting the piles and subsequently lifting the same in tilted position. The piles are provided with means for fitting a closure therein at the bottom end. In tilted piles, this closure can be fitted after the pile lies on the ground in tilted position.

The method according to the present invention offers a great many advantages over the conventional open excavation method, mainly resulting from the following pile properties:

- after closure of the top and bottom ends, the pile forms a closed reactor vessel providing for the possibility of treating the polluted material enclosed therein, e.g. cleaning, by injecting cleaning liquids and/or gases into the pile forming a closed reactor vessel and causing them to react with the polluted soil. This treatment can take place with a pile still having a
- vertical position in the soil or after transport of the pile with the soil contained therein to e.g. a cleaning installation
- after the removal of the pile from the soil, the material enclosed in the pile is sealingly 'packaged' in a transportable container that is easily moved to a desired location or possibly stored in the thus packaged form,
- as the piles are installed in the soil according to a lattice pattern in adjoining relationship, it is possible to follow a possibly capricious pattern of the polluted soil surface, so that the number of m³ of soil to be moved can be restricted to the required number of m³,
- the piles installed in the soil form a good support, e.g. for a roof and for equipment required for driving the piles into the soil or pulling them out of the soil in the middle of a polluted area of low bearing capacity,
- the piles at the edges of the polluted area can remain in the soil so as to form a water and/or soil retaining wall around the excavated area,
- the piles can be cleaned on the outside as they are being pulled out of the soil to remove appendant polluted material from the piles.

In certain cases, depending on the pollutants contained in the soil, it will not be necessary to remove the polluted material, but it will be sufficient to treat the same, provided such material or soil is isolated from the surroundings. In that case, after the piles have been driven into the soil, and at any rate closing the bottom end thereof, a treating agent can be introduced into the soil enclosed within the pile, which agent is capable of converting the pollutants present into a more harmless form. In that case the piles need not to be removed from the soil and e.g. may remain in the soil as a foundation for a structure to be subsequently erected. The pile is then used exclusively as a reactor vessel which isolates the portion of the soil to be cleaned fully from the surroundings, so that the cleaning treatment does not result in contamination of the soil in the vicinity of the pile. The isolation in cellular form, permits subjecting each cell to a different treatment should this be necessary.

In contrast to the conventional excavation method, a further advantage of the method according to the present invention is that during the placing of the pile into the soil, the composition of the pollutant in the soil is hardly, if at all, disturbed or displaced.

Figures 5A, 5B:
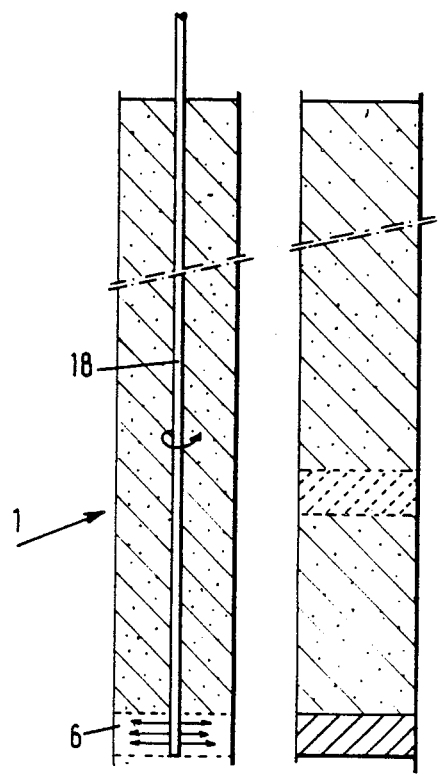
Figures 6A, 6B, 6C:
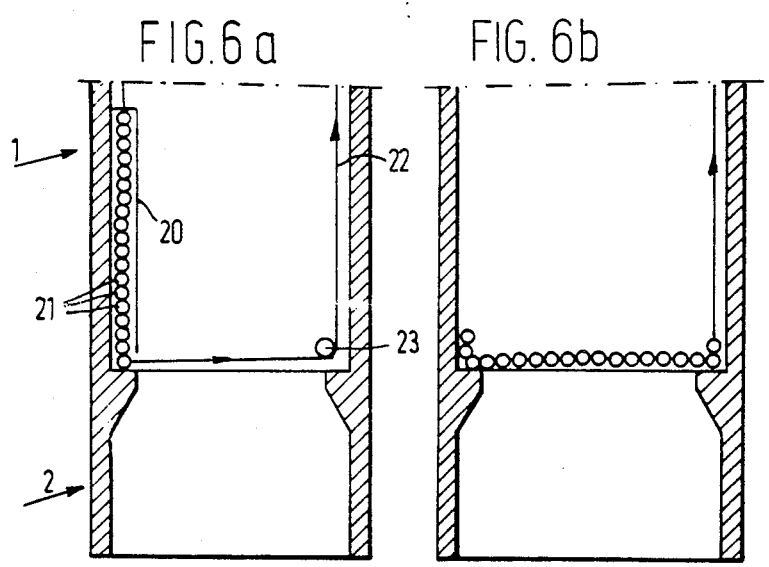

The present invention also relates to piles suitable for application of the method according to the invention. These piles will be referred to hereinafter as 'container piles'. Some embodiments thereof will now be described, by way of example, with reference to the accompanying drawings, in which:

FIG. 1 is a diagrammatic cross-sectional view of a container pile according to the present invention;

FIGS. 2a–c diagrammatically shows embodiments of shut-off valves suitable for closing the bottom end of the container pile;

FIG. 3 shows the valves according to FIG. 2b in closed position;

FIG. 4 diagrammatically shows a construction for closing a valve according to FIGS. 2 and 3;

FIGS. 5a and b shows a variant of the closure means for closing the bottom end of the container pile;

FIGS. 6a–c shows another embodiment of possible closure means for the container pile; and FIG. 7 shows a washing device for container piles.

FIG. 1 diagrammatically shows a container pile or tube 1 driven into the soil and only the top end of which projects from the earth surface 4.

At its bottom end, container pile 1 is provided with a cutting edge 2, while guide means 3 are provided on at least two adjoining side walls. Said guide means may take the form, for example, of mutually parallel, spaced apart and outwardly extending ribs and serve for installing the next pile next to and in contact with the container pile 1 previously driven into the soil. Pile 1 may consist of various parts vertically linking up with each other, which provides for the possibility of composing piles of different lengths by means of standard lengths. At the top and bottom ends of the pile, a stiffening cross 24 (see FIG. 6c) will usually be provided. After pile 1 has been driven entirely into the soil to the desired depth, the pile is shut off at its bottom end through means diagrammatically indicated at 6 in FIG. 1.

The top end of the pile is also shut off e.g. by means of a layer 5 of concrete cast on and in the pile, or by a steel cover. Through the upper closure 5 a feed tube 7 can be inserted for supplying flushing or injection agents to the interior of the pile, as well as a discharge tube 8 for discharging gases or liquids, whether or not produced as a result of a reaction occurring within pile 1 owing to the supply of e.g. cleaning agents through said feed tube 7 for the polluted material contained in container tube 1. A measuring tube is indicated at 9, e.g. for use in making of pressure and temperature measurements within the reactor vessel formed by container tube 1.

FIG. 1 shows that, after the removal of the pile from the soil, there is obtained a closed container with polluted or possibly already treated material 10, which can be transported and possibly stored with this 'package'.

FIGS. 2–4 show valve means for shutting off the bottom end of tube 1. Said valves are fastened at the bottom end of the tube adjacent the cutting edge 2 and are accommodated in chambers 12 in the side walls of tube 1. Valves 11 are mounted in the sidewall for pivotal movement about a pin 13 at their lower ends. When tube 1 is driven into the soil, valves 11 remain stored in chambers 12. After tube 1 has been lowered into the soil to the correct depth, valves 11 are put under pressure from the outside, so that they will swivel inwardly about pin 13. Exerting pressure in inward direction on valves 11 may be effected e.g. in a manner indicated in FIG. 4. On or in a side wall of pile 1, there is fitted a conduit or channel 14, terminating in laterally extending channels 15, 16 opening into chamber 12, at the rear of a shut off-valve 11. Said chamber 12 may accommodate e.g. a diaphragm 17. By supplying a hydraulic fluid under pressure to channel 14, a lateral pressure is exerted on valve 11, which is sufficiently high to swivel valve 11 about pivot pin 13 inwardly some distance. It is not necessary to entirely close the valve or valves 11 in the above described manner. When a valve 11 has been pressed inwardly to the extent that it projects beyond chamber 12, valve 11 can be shut entirely by lifting the pile along a short distance.

As shown in FIG. 2, a single-part shut-off valve 11 may be fastened at the bottom end. The valve may naturally also consist of two parts, as shown in FIG. 2b, or possibly four triangular parts, as shown in FIG. 2c.

FIG. 5 shows a different method of fitting a closure at the bottom end of container tube 1. Inserted in tube 1 is a conduit 18 having an opening at its bottom end. Conduit 18 is inserted into pile 1 to such a depth that its orifice at the bottom end is approximately at the level of the cutting edge of tube 1. Subsequently, a suitable material, e.g. grout, is injected under pressure into the bottom of the tube through conduit 18, which material forms a sealing disc 6. To improve the adherence of said disc to the wall of pile 1, said wall is preferably provided on the inside with cut-outs or ribs. Such a disc can be provided not only at the bottom end but also at other levels within the container pile, as shown in FIG. 5b. The above described method is known per se by the name of jet grouting.

Another embodiment of the means for closing the bottom end of the pile 1 is shown in FIGS. 6a–c. FIG. 6a shows a cross section of the end of a container pile 1 adjacent cutting edge 2. In a chamber 20 present in a side wall there is provided a flexible screen consisting of interconnected bars 21. To the bottom end of said screen there are connected pulling cables 22, which are guided to the top edge of pile 1 via rollers 23 fastened on the opposite side wall. After pile 1 has been installed entirely into the soil and at a sufficient depth, the flexible screen is pulled out of chamber 20 by pulling cable 22, so that a sealing screen positioned horizontally in the pile 1 is produced, as shown in FIG. 6b. For guiding and supporting the bars 21, there are provided guide channels in side walls 25, 26 situated opposite the ends of bars 21. Just underneath said guide chutes provided in the side walls 25, 26, there is arranged a stiffening cross 24 in pile 1.

Pulling cables 22 extend above the central post and the side edges of stiffening cross 24 so that cables 22 are not pressed away by the soil penetrating the container pile.

The above indicated embodiments for shutting off the bottom end of tube 1 may naturally also be combined with each other. Above the laterally swiveling shut-off valves shown in FIGS. 3, 4, there may be provided e.g. an additional closing layer in accordance with the method described in FIG. 5. Also other closing methods are possible, such as a local freezing of the soil near the cutting edge 2 of pile 1. Via injection channels situated in or on the side walls of the pile or possibly also by introducing jet pipes, cold-carriers can be supplied to the bottom of the soil in the container pile 1, so that the material within the pile can be locally frozen. Naturally, this can be done also in other places to provide a plurality of closing discs of frozen material of substantial bearing capacity in pile 1. It is also possible to make the cutting edge of smaller diameter than the adjoining part of the pile 1 containing a stiffening cross, thereby to promote bridging at the bottom end of the pile, to impede or prevent outflow of soil from the pile as this is pulled out of the soil.

During the installation of a series of container piles in the soil in adjoining relationship according to a lattice pattern a small strip of material will remain between adjacent piles that is not received within the piles but which is enclosed laterally by the adjoining piles. The thickness of this strip of material depends among other things on the lateral dimension of the guide means 3 provided on the side walls of pile 1. For the purpose of treating also this strip with a liquid or gas, outwardly terminating channels or conduits, not shown, may be installed in or on at least one side wall of the pile, through which a treating medium can be injected into said strip.

The polluted material sticking to the side walls of the pile as this is pulled out of the soil can be removed by means of a washing device, as shown in FIG. 7. A pile 31 just pulled out of the soil by means of a crane 30 is surrounded by a curtain construction 32 attachable to crane 30. Said construction 32 incorporates a vertically movable jetting and brushing system 33. The material removed from pile 31, together with the jetting water, is collected in a receptacle 34 provided underneath said curtain construction 32, said receptacle being supported by a positionable device 35.

What we claim is:

1. A method of cellularly isolating, treating and/or removing strongly polluted material present in or on the soil, characterized by
    a. placing laterally closed, hollow piles in the soil according to a lattice pattern in adjoining relationship to enclose entirely within the piles a volume of the polluted material, said piles being closable at the bottom and top ends;
    b. closing of the bottom and top ends of the piles placed in the soil;
    c. removing the piles with the polluted material enclosed therein from the soil; and
    d. transporting the piles with the material contained therein.

2. A method of cellularly isolating and treating strongly polluted material present in or on the soil, characterized by
    a. placing laterally closed, hollow piles in the soil according to a lattice pattern in adjoining relationship to enclose entirely within the piles a volume of the polluted material, said piles being closable at the top and bottom ends;
    b. closing of the bottom and top ends of the piles placed in the soil; and
    c. passing a treating medium into the polluted material enclosed within a pile.

3. A method of isolating and removing polluted material present in soil, comprising:
    driving a plurality of laterally closed, hollow piles into the soil in adjoining relationship to enclose entirely within the piles a volume of the polluted material in the soil;
    closing the piles at the bottom and top;
    removing the piles with the polluted material enclosed therein from the soil; and
    transporting the piles with the polluted material contained therein.

4. A method of isolating and treating polluted material present in soil, comprising:
    driving a plurality of laterally closed, hollow piles into the soil in adjoining relationship to enclose entirely within the piles a volume of the polluted material in the soil;
    closing the piles at the bottom and top; and
    passing a treating medium into the polluted material enclosed within at least one of the piles.

* * * * *